March 9, 1971 — R. D. COPLEY ET AL — 3,568,418
COTTON HARVESTER
Filed May 14, 1969 — 2 Sheets-Sheet 1

INVENTORS
RUSSELL D. COPLEY
RONALD K. LEONARD
BY William A. Murray
ATTORNEY

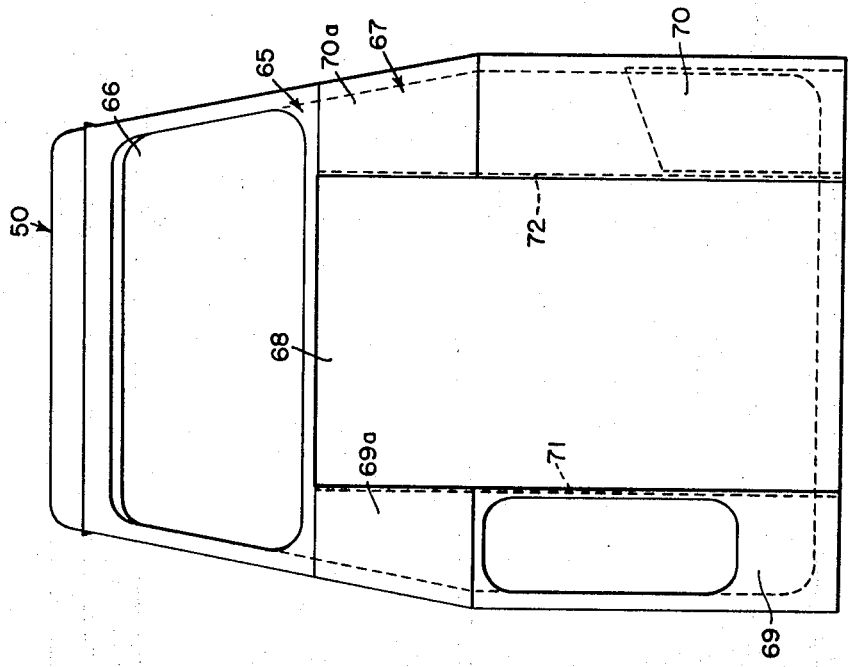
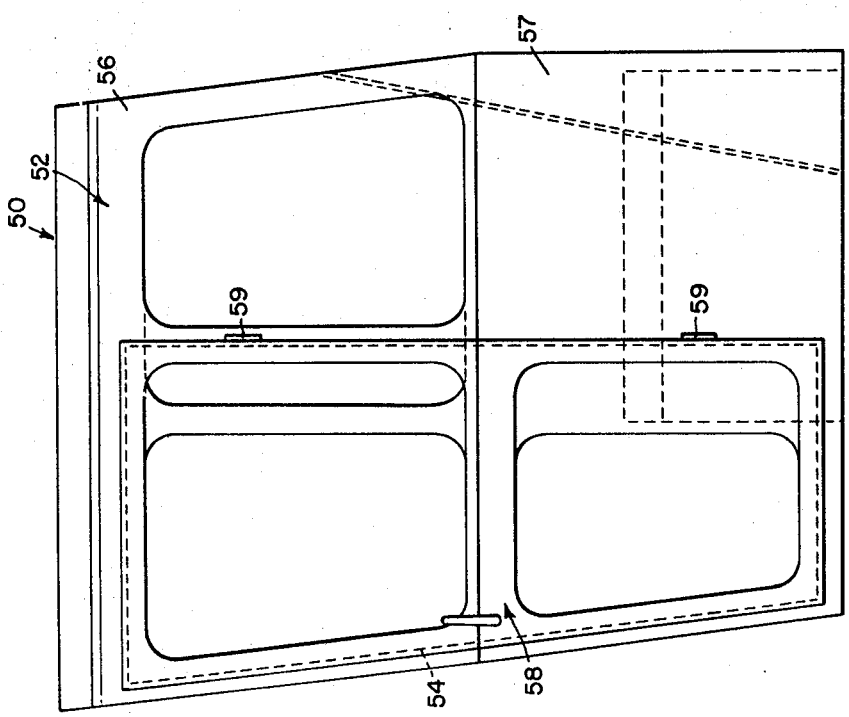

United States Patent Office 3,568,418
Patented Mar. 9, 1971

3,568,418
COTTON HARVESTER
Russell Dean Copley, Ankeny, and Ronald Keith Leonard, Des Moines, Iowa, assignors to Deere & Company, Moline, Ill.
Filed May 14, 1969, Ser. No. 824,400
Int. Cl. A01d 45/20
U.S. Cl. 56—12                                                7 Claims

ABSTRACT OF THE DISCLOSURE

A cab and ladder structure for a cotton harvester in which the cab is positioned between outboard conduits and forward of the inboard conduits of the cotton harvester and in which the upper portions of the sides of the cab are inclined inwardly to accommodate the upper portions of the inclined outboard conduits and the rear wall structure of the cab is recessed to accommodate the descent of the central conduits. The ladder structure includes a platform extension at the exit of the cab and an upwardly inclined ladder that bridges over one of the outboard conduits.

BACKGROUND OF THE INVENTION

Cotton harvesters have conventionally been adapted to harvest a pair of adjacent rows of cotton plants and include a pair of harvesting units positioned forwardly of a cotton receptacle. Cotton is fed into the receptacle from the harvesting units by a pair of outboard conduit means extending from the front outer parts of the respective units upwardly, inwardly and rearwardly to the cotton receptacle, and central conduit means extend from inner parts of the harvesting units upwardly and rearwardly into the receptacle. An operator's platform is provided at the forward portion of the harvester between the outboard conduits and forwardly of the inboard conduits. Access is provided to the platform from the front outer corner of one of the harvesting units and access is provided between the platform and the top of the receptacle by a ladder that extends from the central rear portion of the platform over the central conduit means and extending from a lower end on the platform to an upper end at the top of the receptacle. Such a structure is shown and described in a now pending application, Ser. No. 727,843, filed by Karl I. Graham on May 9, 1968.

Due to the hot climatic conditions under which many cotton harvesters are used, it is desirable to provide a cab for a cotton harvester. With the above-described type of cotton harvester, there are many difficulties encountered, the first being that the platform supporting the operator, while sufficiently large at its base to support a cab, is restricted in its head room due to the inwardly inclined outboard conduits that extend from the harvester to the receptacle. Also, the central conduits restrict the fore-and-aft length of the cab. Further, should a cab be provided on the platform, there is eliminated the accessibility of the now conventional-type central ladder for permitting access to the top of the receptacle.

SUMMARY OF THE INVENTION

With the above in mind, it is the primary object of the invention to provide a cab, with or without air conditioning, that is supported on the platform and which has outer longitudinally extending sides with lower vertical portions and upper inclined portions that accommodate the inclination of the outboard conduits. It is also contemplated to provide a central recess in the rear wall of the cab that accommodates the central conduits that extend from the rear of the harvesting units to the receptacle.

With the above cab, it is proposed to provide a platform extension adjacent one of the longitudinal sides and at the exit in the side. The platform extension is positioned forwardly of one of the outboard conduits, and it is a further object of the invention to provide a ladder, beginning at a lower rung adjacent the platform extension and extending upwardly and inwardly above the respective outboard conduit. The rungs of the ladder will bridge the overside of the outboard conduit and the ladder will terminate adjacent the upper end of the outboard conduit and adjacent the top portion of the receptacle.

BRIEF DESCRIPTION OF THE DRAWINGS

FIG. 3 is a side view of the cab structure.
FIG. 4 is a side view of the cab structure.

DESCRIPTION OF THE PREFERRED EMBODIMENT

Figures 1, 2:
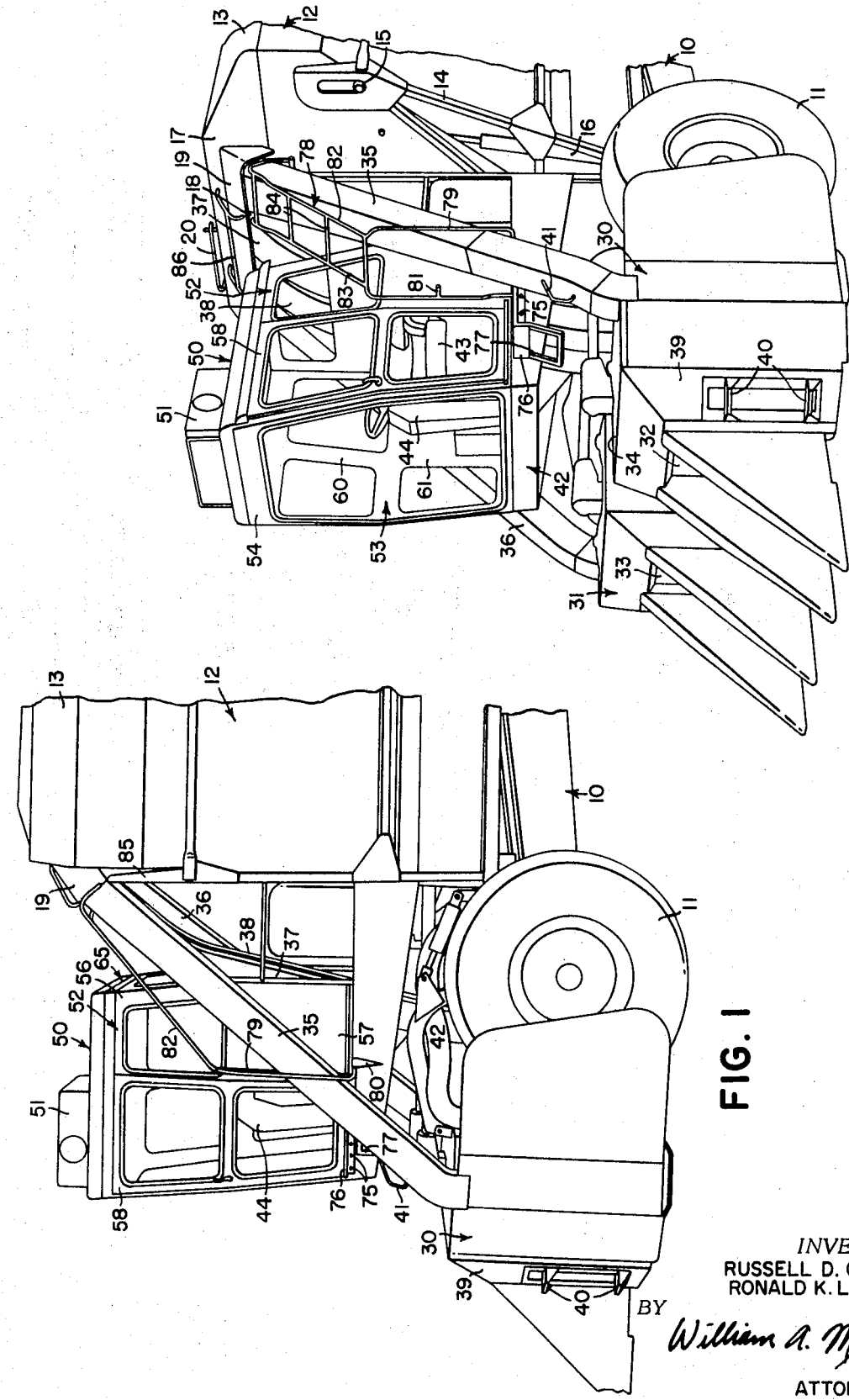
FIG. 1 is a side perspective view of the front portion of the cotton harvester utilizing the structure of the present invention.
FIG. 2 is a front and side perspective view of the front portion of the harvester shown in FIG. 1.

Referring now to FIGS. 1 and 2, the cotton picker includes a main frame 10 carried at its rear end by guide wheels (not shown) and at its forward end by a pair of traction wheels, one of which is shown at 11. Carried on the rear portion of the frame 10 is a picker basket 12. The basket 12 includes a lid 13 hinged to open by suitable linkages as the basket is filled and tilted. The basket 12 is carried on rigid framework 14 that carries a fore-and-aft extending horizontal pivot structure 15 on which the basket 12 may be tilted upwardly over the pivot structure 15 so as to discharge cotton over the upper fore-and-aft edge of the basket. Suitable hydraulic cylinders 16 are provided for the purpose of tilting the basket 12. The lid 13 includes a front upright wall 17 with a central inlet opening 18 that is covered by a rigid forwardly projecting hood 19. As is conventional, a fore-and-aft extending grille structure (not shown) extends rearwardly from the hood 19 along the top of the basket. Portions of this grille structure may be opened so as to permit ingress and egress into and from the basket. Also provided on opposite sides of the grille structure is a pair of fore-and-aft extending horizontal walkways on which an operator may walk to clean and otherwise inspect the grille structure. A U-shaped handrail 20, shown in its horizontal or down position in FIG. 2, may be raised and locked in a vertical position to offer balance and support for an operator walking along the walkways. All of this structure is shown and described in more detail in the aforementioned pending application Ser. No. 727,843.

Also supported on the frame 10 forwardly and beneath the basket 12 is a pair of row units 30, 31 that are adapted to harvest adjacent rows of cotton. The row units 30, 31 are composed of housing structure defining a pair of fore-and-aft extending passages 32, 33 for receiving adjacent rows of cotton plants as the harvester advances. Each of the harvesting structures 30, 31 has an upper horizontal plate or panel 34 that defines the top of the housing structure. The panels 34 are suitably braced and supported so as to carry the drive mechanism for the respective harvesters as well as to support a person standing on the respective units. The row units 30, 31 are of conventional nature and are adapted to harvest cotton from the plants and each row unit is adapted to move the harvested cotton bolls partially outboard and forwardly in respect to the plant passage and partially inboard and rearwardly in respect to the same plant passage. Thus, there is required a pair of upwardly, rearwardly and inwardly converging outboard conduit means or ducts 35, 36 that extend from the forward outboard portions of the units 30, 31 to the receptacle 12 and more specifically to the hood portion 19. Central conduit means in the form of a pair of cotton conveying ducts 37, 38 extend from the inner rear portion of the harvesting units 30, 31 upwardly and rearwardly into the opening 18 and under the hood 19. The housing of the harvesting unit 30 also includes at its forward outside corner an upright diagonally extending panel 39. Recessed in the panel 39 are a series of vertically spaced openings that define steps 40 on which a person may climb to the horizontal upper panel 34 of the unit 30. A hand support 41 is fixed to the forward outer surface of the duct 35 so that a man climbing or descending the steps 40 may balance himself by gripping the support.

Supported on the frame 10 above the horizontal surfaces 34 and forwardly of the basket 12 is an operator's platform 42. Carried on the platform 42 is a forwardly facing seat 43 and a steering wheel and control console 44. Supported on the platform is a cab structure indicated in its entirety by the reference numeral 50. The cab structure includes an air conditioning unit 51 that sits on the top of the cab 50. The cab structure 50 is composed of an upright housing closed at its top and having opposite left- and right-hand longitudinally extending wall structures 52, 53 and an upright transparent wall or window 54. The left-hand wall structure 52 is composed of an upper portion 56, and a lower vertical portion 57. The upper portion 56 is inclined inwardly so as to accommodate the inward inclination of the duct 35. The left-hand wall structure 52 has an exit therein that is normally closed by a door 58 hinged at 59. The right-hand wall structure 53 is composed of an upper portion 60, also inclined to accommodate the inclination of the outer duct 36 and a lower vertical portion 61.

The rear wall structure 65, shown specifically in FIG. 4, is composed of an upper window portion 66 through which an operator may view the basket 12, and a lower portion 67. The lower portion is composed of a central inclined panel 68, slightly wider than both of the central or inner ducts 37, 38 and that is offset forwardly from a pair of vertical wall structures 69, 70, there being provided a pair of fore-and-aft extending upright panels 71, 72 that extends from the rear panels 69, 70 to the central panel 68. For purposes of better viewing, the window 66 is slightly inclined and a pair of connecting panels 69a and 70a extend from the lower edge of the window structure 66 to the upper edge of the panels 69, 70. It will thus be seen that the upright panels 71, 72 and the central panel 68 form a rearwardly opening recess in the cab structure 50 that accommodates the inclination of the central conduit means 37, 38.

Bolted as at 75 to the left side of the platform 42 is a platform extension 76 that extends from the exit of the side wall structure 52. The platform has a ladder section 77 depending therefrom on which an operator may move from the extension 76 to the surface 34 of the left harvesting unit 30. The platform extension 76 as may be seen clearly from viewing FIG. 2, is readily accessible to an upwardly, rearwardly and inwardly inclined ladder structure 78. The ladder 78 includes a rectangular upright front tubular portion 79 that fits around the the lower section of the outboard duct 35 and is fixed by a bracket 80 to the side of the platform 42. A short stub rung 81 projects from the inner side of the tubular portion 79 and serves as a first step in ascent to the top of the basket 12. The ladder 78 also includes a step portion that includes a pair of side members 82, 83 that are slightly above the conduit 35 and are rigidly interconnected by rungs 84 that bridge across and are above the conduit 35. The upper ends of the side members 82, 83 project downwardly and are connected and supported on upright structure 85 that is rigid with the rear portion of the platform 42. The entire ladder structure 78 provides means for ascent and descent between the operator's platform extension 76 and the upper portion of the basket 12. A step-over rung 86 is provided on the hood 19 so as to permit an operator to step onto the aforementioned walkways on the top of the basket lid 13.

We claim:

1. A cab structure for a cotton harvester machine having a pair of forwardly positioned cotton harvesting units for simultaneously harvesting a pair of adjacent rows of cotton plants, a cotton receptacle positioned above and rearwardly of said units, vertically extending outboard and central cotton transferring ducts for transferring picked cotton from lower ends in communication with the forward outboard and inner rearward portions respectively of said units to upper ends in communication with the receptacle, and a platform positioned forwardly of the central and between the outboard ducts, the cab structure comprising: a housing closed at its top supported on the platform and having left- and right-hand upright wall structures inboard of and closely adjacent the inner sides of the outboard ducts, one of said structures including door means, a front wall and a rear wall structure having adjoining upper and lower portions, the upper portion being offset rearwardly of the lower ends of the central and outboard ducts and having a window therein through which an operator may view the receptacle, the lower portion having a rearwardly opening recess therein for accommodating the central of the ducts.

2. The structure as set forth in claim 1 in which the outboard ducts are inclined upwardly and inwardly between their lower and upper ends, and the left- and right-hand wall structures have upper portions inclined inwardly to permit the adjacent inner sides of the inclined outboard ducts to pass adjacent thereto.

3. The structure as set forth in claim 2 further characterized by a ladder supported by the platform and positioned over one of the outboard ducts with rungs of the ladder bridging the respective duct, the ladder extending from a lower end adjacent the platform to an upper end adjacent the receptacle.

4. The structure as set forth in claim 3 in which the platform has an extension extending outwardly from the upright wall structure adjacent the ladder, the extension being beneath the lower rung of the ladder, and the adjacent upright structure include said door means therein for ingress into and egress from the cab structure.

5. The structure as set forth in claim 4 in which the harvesting units have flat upper surfaces beneath the extension for supporting an operator leaving the extension, and the harvesting unit on the side having the extension has step means on a vertical side thereof for permitting an operator to ascend and descend the top of the harvester.

6. In a cotton harvester machine having a pair of forwardly positioned cotton harvesting units for simultaneously harvesting a pair of adjacent rows of cotton plants, a cotton receptacle positioned above and rearwardly of said units, vertically extending outboard and central cotton transferring ducts for transferring picked cotton from lower ends in communication with the forward outboard and inner rearward portions respectively of said units to upper ends in communication with the receptacle, a platform positioned forwardly of the central and between the outboard ducts, and a cab structure closed at its top supported on the platform and having left- and right-hand upright wall structures inboard of and closely adjacent the inner sides of the outboard ducts with one of said upright wall structures having an exit therein, the improvement comprising: a platform extension rigid with the platform and projecting therefrom at the exit and forwardly of the outboard duct adjacent the respective wall structure having the exit, and a ladder extending upwardly and rearwardly from a lower end adjacent the extension to an upper end at the upper portion of the receptacle with the rungs thereof bridging over and across the respective outboard duct in its ascent to the receptacle.

7. A cab structure for a cotton harvester having a harvesting mechanism, a receptacle above and rearwardly of the mechanism, an operator's platform above the harvesting mechanism and forward of the basket, and central and outer conduit means extending from the harvesting mechanism to the receptacle with the central conduit means being positioned behind the platform and forwardly of the receptacle and the outer conduit means extending from lower ends outwardly of the platform upwardly and rearwardly to upper ends inwardly of the opposite longitudinal edges of the platform and converging with the central means at the receptacle, the cab structure comprising outer longitudinal wall portions extending inwardly of the outer conduits and upwardly from the platform and having lower and upper portions, with the upper portion being inclined to accommodate the inward inclination of the outer conduit means, said wall portions including door means, and a transverse rear wall structure having upper and lower portions with the lower of said portions having a central vertical recess therein that opens rearwardly to accommodate a portion of the central conduit means.

References Cited

UNITED STATES PATENTS

| | | | |
|---|---|---|---|
| D. 185,562 | 6/1959 | Palmer | D40—1 |
| 2,834,633 | 5/1958 | Ashton | 296—28 |
| 3,196,599 | 7/1965 | Meiners et al. | 56—11 |
| 3,294,371 | 12/1966 | Hubbard | 56—11 |
| 3,401,510 | 9/1968 | Hubbard | 56—30 |
| 3,484,802 | 12/1969 | Reece et al. | 56—12 |
| 3,487,450 | 12/1969 | Hubbard | 56—12 |

RUSSELL R. KINSEY, Primary Examiner

U.S. Cl. X.R.

296—28